Dec. 7, 1965     W. E. ARNOLDI ETAL     3,221,477
SPACE ADSORPTION SYSTEM AND METHOD
Filed April 24, 1961     3 Sheets-Sheet 1

POSITION DIAGRAM OF VALVE 32

INVENTORS
WALTER E. ARNOLDI
DONALD G. DE ROZE
DAVID C. JENNINGS
GEORGE T. PETERS

BY Norman Friedland
AGENT

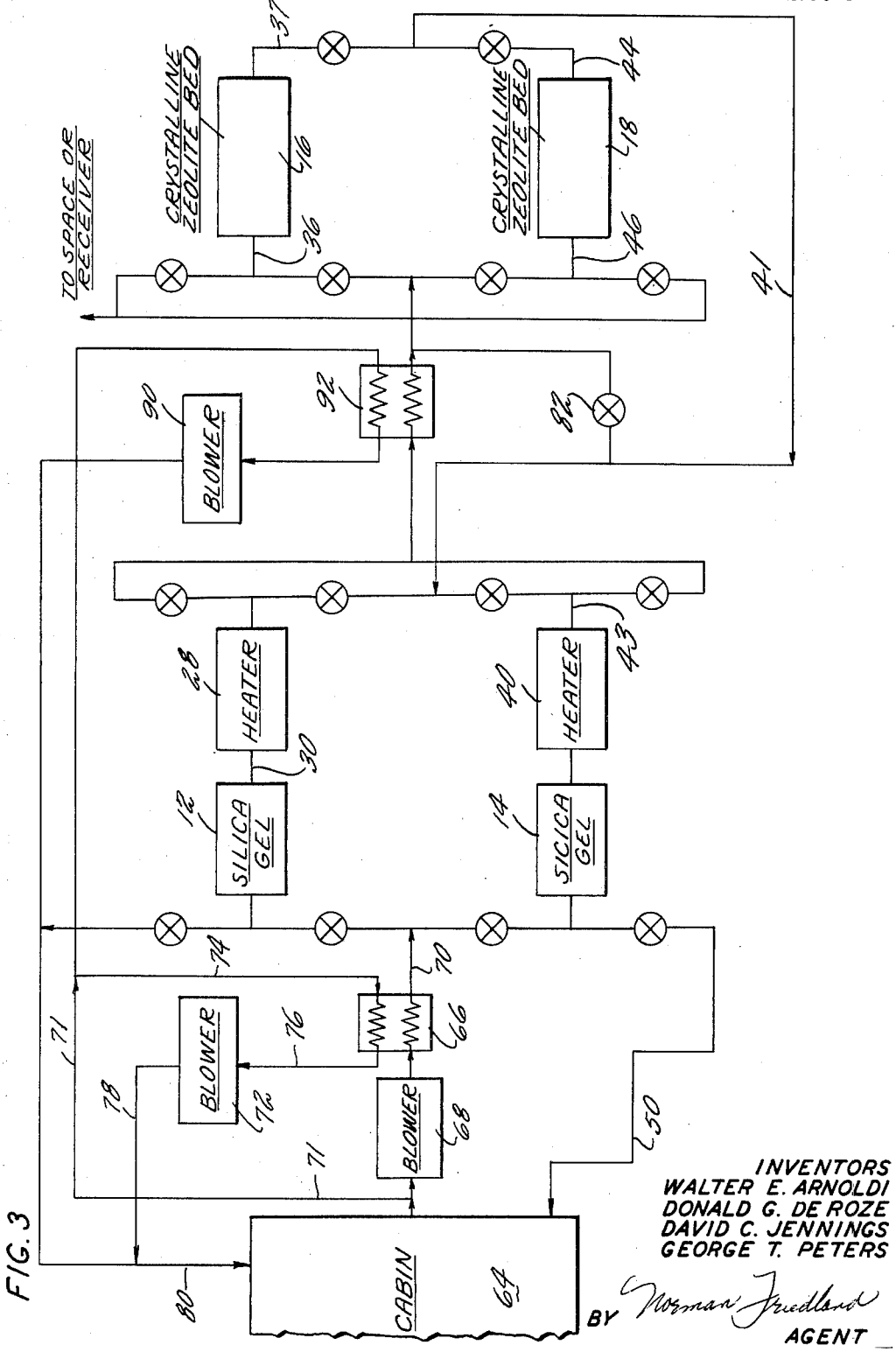

Dec. 7, 1965   W. E. ARNOLDI ETAL   3,221,477
SPACE ADSORPTION SYSTEM AND METHOD
Filed April 24, 1961   3 Sheets-Sheet 3
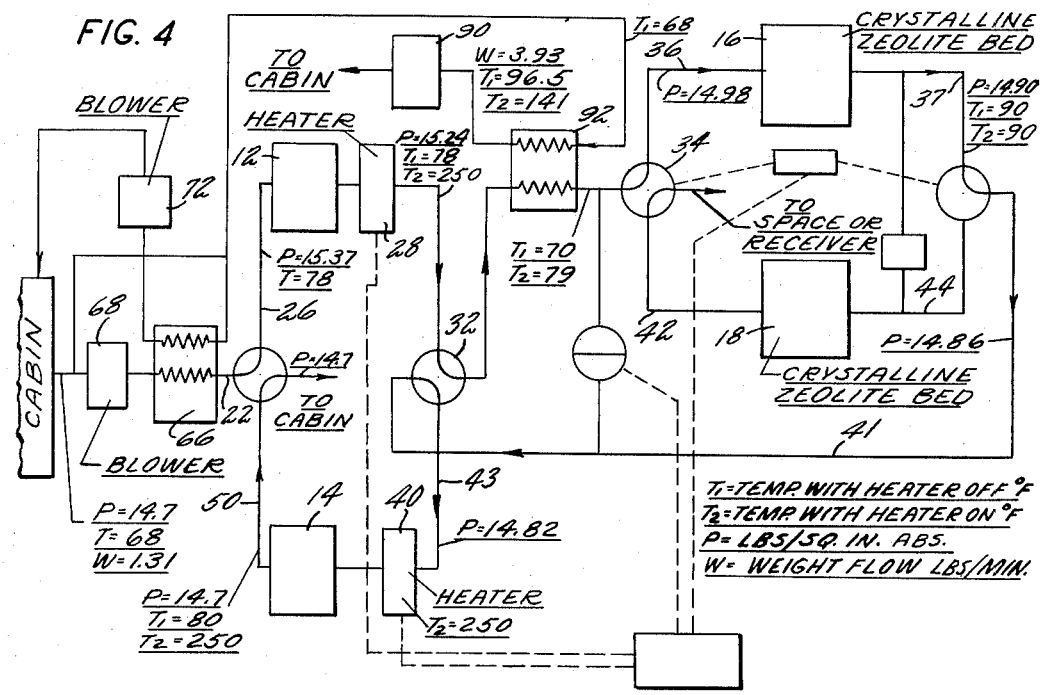
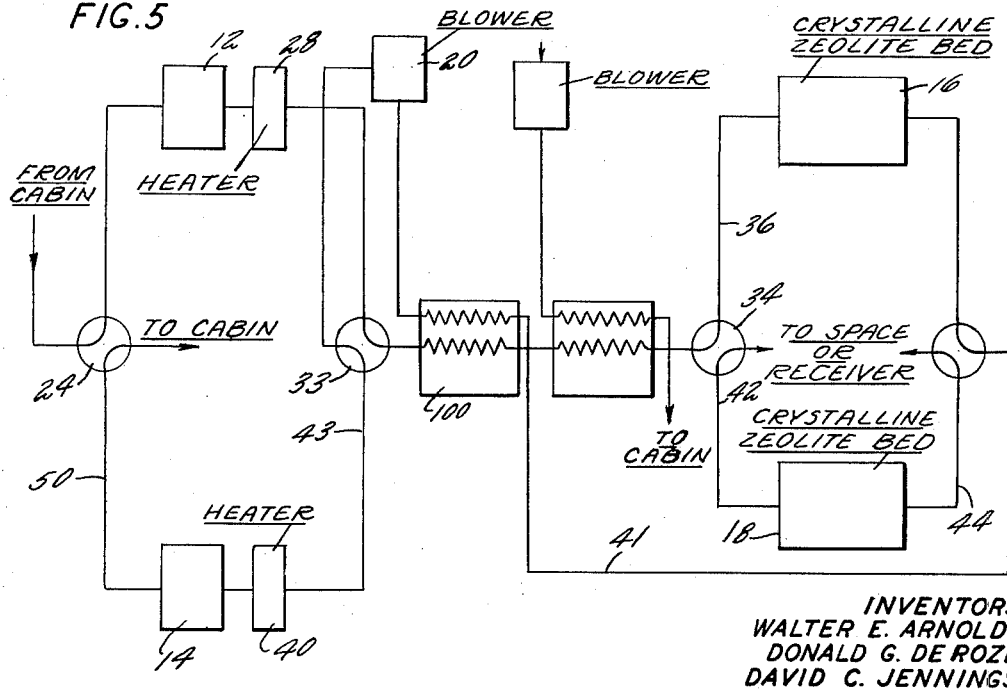
INVENTORS
WALTER E. ARNOLDI
DONALD G. DE ROZE
DAVID C. JENNINGS
GEORGE T. PETERS
BY *Norman Friedland*
AGENT

# United States Patent Office 3,221,477
Patented Dec. 7, 1965

3,221,477
SPACE ADSORPTION SYSTEM AND METHOD
Walter E. Arnoldi, West Hartford, Conn., Donald G. De Roze, Dayton, Ohio, and David C. Jennings, Windsor Locks, and George T. Peters, Hartford, Conn., assignors to United Aircraft Corporation, East Hartford, Conn., a corporation of Delaware
Filed Apr. 24, 1961, Ser. No. 105,187
14 Claims. (Cl. 55—31)

This invention relates to air purification systems and more particularly to carbon dioxide removal systems of the adsorption type adapted to be utilized for a closed compartment.

Application U.S. Serial No. 104,892, filed on April 24, 1961 and assigned to the same assignee discloses carbon dioxide removal system by adsorption means and reference is hereby made thereto.

It becomes of the utmost importance, particularly in manned space vehicles, to maintain the concentration of carbon dioxide in the atmosphere of the vehicle at a tolerably low level. In considering the design for such a device, extensive consideration must be given to the power requirements, expendable mass, fixed mass, mission time, heat rejection and overall weight and size. Each mission which the vehicle is intended to accomplish and size of the space vehicle will dictate the particular design considerations. Although the system may at times operate in an accelerated motion, it must be inherently able to operate in the absence of such motion and gravity forces. We have devised a suitable system that satisfactorily accomplishes the requirement necessary for a range of space flight missions. Incidentally, the present invention has, to date, been successfully tested for carbon dioxide removal effectiveness.

It is an object of this invention to provide in a system, as described, a pair of crystalline zeolite adsorption beds cooperating with a pair of silica gel adsorption beds, each pair being cyclically regenerative independent of the other.

It is a further object of this invention to provide a system and method which is characterized as being relatively simple, extremely reliable, and affords the characteristic described above.

It is still a further object to utilize the carbon dioxide adsorber effluent air to purge the silica gel beds.

Other features and advantages will be apparent from the specification and claims, and the accompanying drawings which illustrate an embodiment of the invention.

FIG. 3 is another modification of the invention employing heat exchangers.

FIG. 4 is another diagrammatic illustration of our invention and including an example of the temperature, pressure and flow characteristic of the fluid at various points throughout the system.

FIG. 5 is another schematic illustration of the invention.

In the interest of removing carbon dioxide by expending a small amount of power, it becomes a necessity to remove the moisture entrained in the atmosphere prior to removing the carbon dioxide from the atmosphere. As a practical solution to this problem, several physical adsorption devices are attractive because they lend themselves to being regenerated over repeated operations without substantially losing capacity to adsorb. Since the effectiveness to adsorb is different for the two types of adsorption beds, i.e. the moisture removal and carbon dioxide removal, this system provides different regenerating cycles for each type.

In this manner, the system is afforded a high degree of adsorption for a small amount of power expended. Along the same vein, to conserve power, the heaters are also independently cycled so that the operation time will be limited to afford a maximum desorbing effect of the silica gel bed. Although the invention shows in its preferred embodiment electrical means for generating heat, other mediums may be equally employed without departing from the scope of this invention.

Figure 1:
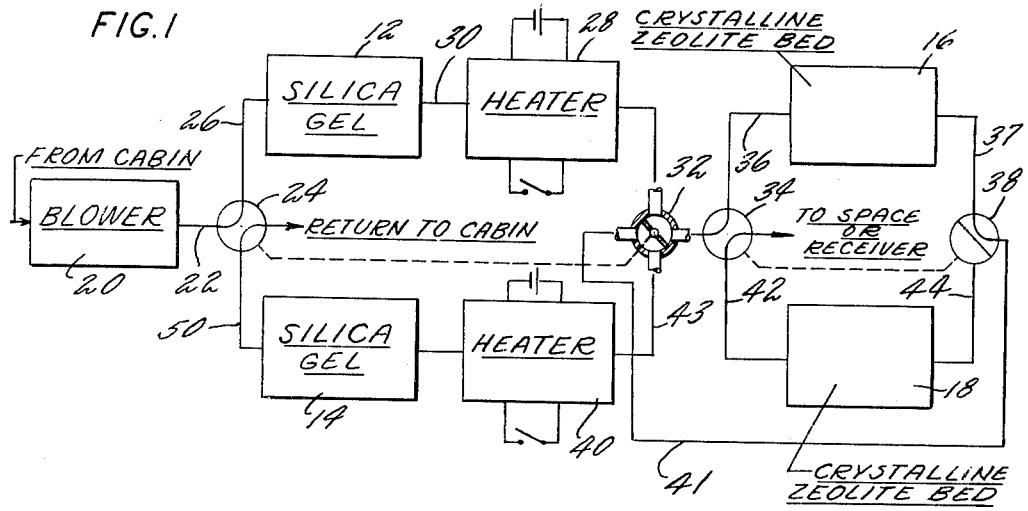
FIG. 1 is a diagrammatic illustration of the invention.

A preferred embodiment of a carbon dioxide removal system, which illustrates the present invention, is shown in FIG. 1 and is comprised of a pair of cyclically regenerative silica gel beds 12 and 14 and cyclically regenerative zeolite beds 16 and 18. As will become more apparent from the description to follow, when one of the silica gel beds is adsorbing, the other is desorbing and similarly when one of the crystalline zeolite beds is adsorbing, the other is desorbing. It is to be understood that in connection with the description to follow, the zeolite adsorbers may be vented to a receiver having a low pressure, such as an evacuated plenum chamber, or vented directly to space. Thus in a submarine application, for example, an evacuated plenum chamber may be utilized.

The silica gel bed is contained within a housing formed from a suitable corrosion resistant structural material. Likewise, the crystalline zeolite beds, known also by the trade names of Molecular Sieve or Microtrap, may be contained in a housing made from a suitable corrosion resistant structural material. A blower 20 may be disposed immediately preceding the removal system which serves to induce flow from the cabin through the system and make up for the pressure loss attendant to the air passing through the various system components.

As mentioned above, during a portion of the cycle when one of the silica gel beds and one of the crystalline zeolite beds are adsorbing, the other beds are in the reverse, desorbing process. Since silica gel affords a high capacity for adsorbing water, and since crystalline zeolite affords a high capacity for adsorbing carbon dioxide, these chemical compositions have proven to be adequate. The purpose of the silica gel is to remove substantially all the water so that air delivered to the crystalline zeolite beds will be substantially free of moisture so that the total effectiveness of the zeolite bed is utilized solely for removing carbon dioxide, thereby conserving moisture from loss overboard of the space vehicle and also preventing loss of capacity of the zeolite by its preferential loading with water. Thus, viewing the system and still referring to FIG. 1, as the air is removal from the cabin by blower 20 and assuming that silica gel bed 12 and crystalline zeolite bed 16 are adsorbing, the air flow will take the following path. Air leaving the blower and discharging into line 22 is delivered by virtue of 4-way valve 24 to the silica gel bed 12 via line 26. At this instance, the silica gel bed serves to remove the moisture as mentioned above. The substantially dry air discharging from the silica gel bed is passed through line 30 through the heater 28 and thence to 4-way valve 32. At this time, heater 28 is unenergized and does not heat the air. By virtue of the position of the 4-way valve 34, the air is delivered into the crystalline zeolite bed 16 via line 36 where the carbon dioxide is adsorbed by the zeolite. The dry residual air leaving the zeolite bed is then utilized to regenerate the other silica gel bed 14 in a manner to be described herein below. The 3-way valve 38 directs the flow to 4-way valve 32 which in turn delivers the air to heater 40. The heater is periodically energized to raise the temperature of the air entering the silica gel bed. The dry warm air then passes through the silica gel regaining humidity from the moisture adsorbed by that bed in a prior cycle. The air then leaves the silica gel bed which has reduced the temperature owing to the heat transfer between the lower temperature silica gel bed and the higher temperature air and is returned to the cabin with all of the original moisture. An advantage of this invention is that no moisture is lost overboard from the space vehicle. As pointed out above, the silica gel beds may be regeneratively cycled to adsorb and desorb at a time interval different from the time interval of the crystalline zeolite beds. This is caused by controlling the ganged 4-way valves 24 and 32 independently of the ganged 4-way valve 34 and 3-way valve 38. Thus, as the cycle through the zeolite beds remains as was described immediately above, the 4-way valves 24 and 32 may be caused to rotate to provide desorbing in silica gel bed 12 while silica gel 14 commences to adsorb.

The desorption is effected by connecting the interior of the crystalline zeolite bed to a low pressure receiver. The vacuum is provided by the outer space environment. This reduction in pressure serves to release the carbon dioxide constituent from its adsorbed condition since it affords an unbalance in the vapor pressures and the excess vapor pressure in the pores of the adsorbent causes desorption. Thus, as shown in the drawing, FIG. 1, crystalline zeolite bed 18 is in the desorbing process and the 3-way valve 38 and 4-way valve 34 isolate the bed and its associated ducting 42 and 44 from the remaining portion of the system, and valve 34 connects line 42 to the vacuum source for venting the carbon dioxide. It will be realized at this point that a certain amount of dry air trapped in the ducting and bed is also vented overboard.

In the interest of conserving the air, 3-way valve 38 is uniquely arranged in the system and sequentially operated so that instead of all the air that would heretofore be vented, only a portion is in fact vented. This is accomplished by connecting the interior of both zeolite beds 16 and 18 with each other just prior to venting either one of the beds to the vacuum source. Half the air that is trapped in the zeolite bed that was just in the adsorbing process flows to the zeolite bed 18, which in the immediately preceding process was desorbing to vacuum. Thus, the flow continues to the bed 18 until the pressures in both beds are equal, and consequently the volume in each bed is substantially equal During this procedure, valve 34 is in the closed position for blocking the flow and 3-way valve 38 connects line 37 with line 44.

Still referring to FIG. 1, the dry carbon dioxide free air discharging from zeolite bed 16 is ducted to heater 40 through line 37 of 3-way valve 38, line 41, 4-way valve 32 and line 43 schematically shown in the drawing. The heater, which may be provided serves to heat the discharge air just prior to the air being injected into the silica gel bed. The air serves to purge the silica gel bed so that the moisture is effectively released from the adsorption. The rehumidified air discharging from the silica gel bed is then return to the cabin via line 50 and the 4-way valve 24. To conserve power, the heaters are intermittently operated and, for example, may operate once for every 5 times the silica bed has been regenerated. The heater is de-energized in sufficient time for the bed to cool before it is switched to adsorption.

Figure 6:
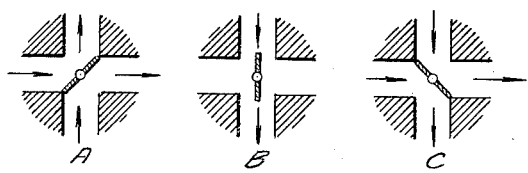
FIG. 6 is a schematic showing of the three positions of a 4-way valve.

Four-way valve 32 also serves as a bypass valve for bypassing the zeolite beds and serves to circulate flow through both silica gel beds. This is required during starting to assure that the silica gel bed is completely purged of moisture before subjecting the air to the zeolite beds. Thus, for example, during starting, valve 32 is in position B shown in FIG. 6, and the air discharging from heater 28 is delivered to heater 40 which is now energized. The warm discharging air is then passed over the silica gel bed 14 for purging the same. As soon as the silica gel bed is purged, the blower discharge air is then ducted to the purged silica gel bed. The cycle for carbon dioxide removal is then started in the manner as was described above.

As has been apparent from the foregoing, precaution for preventing moisture contamination has been adequately provided for. To further protect the zeolite beds from moisture contamination and to prevent loss of the valuable air, valves 34 and 38 are preferably sealed vacuum-tight.

Figure 2:
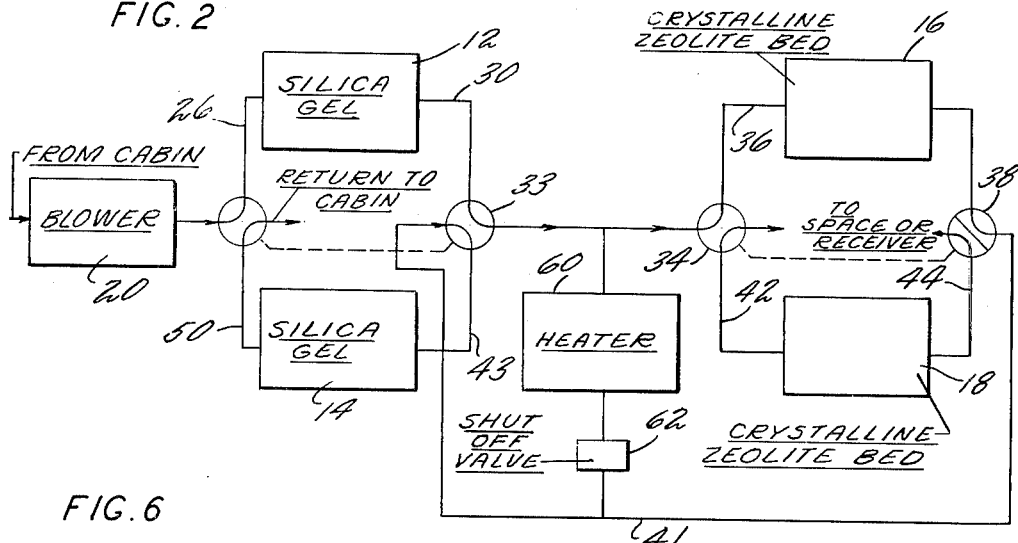
FIG. 2 is a diagrammatic illustration of the invention with two heaters removed and another added in lieu thereof.

FIG. 2 is another exemplary showing of our invention which shows a system identical to FIG. 1 except for the deletion of the two heaters and inclusion of a heater and shut-off valve between the silica gel beds and the zeolite beds. Since the operation of the system is identical to the system shown in FIG. 1, for convenience the detailed description thereof has been eliminated. Because the air discharging from the zeolite bed is at a very low dew point for certain mission requirements, the heaters may not be necessary in the purging of the silica gel beds. Thus, in FIG. 2, a heater 60 is disposed in the line bypassing the zeolite beds and only functions during the starting operation. A shut-off valve, which is normally closed, is actuated during the initial starting so that the silica gel beds would be purged before the complete system is put into operation. This is accomplished by shutting off the valves 34 and 38 and opening shut-off valve 62 so that, for example, and as schematically illustrated in the drawing, the flow will be conducted from the silica gel bed 12 through valve 32 to heater 60 and then through shut-off valve 62 back through 4-way valve 32 and delivered to the silica gel bed 14. The heater during this instance was energized for increasing the temperature of the air to effect the purging of the silica gel bed.

FIG. 3 is another showing of a system similar to the systems described in FIGS. 1 and 2, and likewise a detailed description has been omitted for convenience, since the operation and elements are similar to what has been described in connection with FIGS. 1 and 2. A basic difference between these systems is that heat exchangers are provided between the blower and the silica gel beds and the heaters and the zeolite beds. Another valve arrangement is also employed where the valves may be ganged so that the cyclical regeneration of the adsorption and desorption process functions similarly to what has been described above. As shown in FIG. 3, the blower 68, which functions identically to what has been already described, delivers the air to be treated to the primary heat exchanger 66 which is in indirect heat transfer relationship with the cabin air. Since this cabin air is cooler than the air leaving the blower, the temperature of the air discharging from the heat exchanger 66 into line 70 will be reduced.

A second blower 72 is disposed between the heat exchanger 66 and cabin 64 and serves as mentioned above to cool the air to be treated. Thus, the air discharging from the cabin is induced through the heat exchanger via lines 71, 74, and 76 by blower 72 and then returned to the cabin via lines 78 and 80. The system contains 14 suitable shut-off valves which function to cyclically regenerate the silica gel beds and the Molecular Sieve in the same manner as was described in connection with FIGS. 1 and 2. Valve 82 serves as a shut-off valve and operates similarly to valve 62 described in connection with FIG. 2. Blower 90 in a like manner to blower 72 places the processed air in indirect heat transfer relation in heat exchanger 92 with the cabin discharge air cooling it prior to its entering the zeolite bed.

FIG. 4 is a modification of FIG. 3 and another exemplary showing of our invention. The primary difference between the systems is that the valves utilized in effecting regeneration in FIG. 3 have been replaced by 4-way and 3-way valves in FIG. 4. FIG. 4 also serves as an example for indicating the temperature, pressures, and flow characteristics of the air.

In the arrangement of FIG. 5 which is still another exemplary showing of this invention, the blower has been located in a different position as was noted in the other drawing. The operation of this scheme is substantially similar to what has been described above and being another basic schematic diagrammatic illustration of a carbon dioxide separation system. Where available, cold air is bled from the cabin heat rejection system and passed through a silica gel bed for dehumidification. The dry air is then cooled by two heat exchangers, first a regenerative heat exchanger 100 to recover heat of adsorption and stored heat from the previous silica gel purge, and second, a cooling heat exchanger 102 to maintain minimum temperature during carbon dioxide adsorption. Cool, dry air is then passed through one of two Molecular Sieve beds for carbon dioxide adsorption, the other being simultaneously desorbed by evacuation to space. From the adsorbing bed the processed air is returned to the regenerative heat exchanger for economy in heating, thence through a fan 104 which compensates for pressure drops throughout the system and adds its own energy to cause a temperature rise in the air. Next. it passes through an electric heater which brings the air temperature up, for example, to 250° F. for purging of the second silica gel bed. The purging of this bed rehumidifies the air, which then returns to the cabin. Purging of the second silica gel bed is accomplished in the same period used for adsorption in the first bed, whereupon these functions are interchanged by means of control valves in order to maintain continuous air drying and rehumidification through cycling of the silica gel. It should be noted that, although water vapor is cyclically stored and released, no net humidity control is provided by this system. Excess moisture removal must be accomplished by other means.

Essentially pure carbon dioxide is dumped overboard by cyclic evacuation of the Molecular Sieve beds, carrying with it only the small amount of cabin air trapped in the residual volume of the adsorbent canisters, ducts, and valves.

This invention takes advantage of two unique opportunities for the space vehicle adsorption system which are not normally exploited in industrial applications of solid adsorbents. With respect to the Molecular Sieve canisters, note that desorption is accomplished by evacuation without heating. Because of the low weight loading of carbon dioxide due to adsorption at a low partial pressure, together with the relatively low heat of desorption, there is adequate heat available from the mass of zeolite to permit desorption without supplying additional energy. It has been verified experimentally that desorption by evacuation alone is effective and that the rate of desorption is determined primarily by the rate of flow out of the canister to vacuum. However, since the carbon dioxide loading of crystalline zeolite at low partial pressure is roughly proportional to the square root of the pressure, effective desorption requires lowering the pressure to the vicinity of 100 microns of mercury or better, and the gas volumes which must be discharged overboard are correspondingly large. Minimum pressure drops through the canisters, valves, and ducts during desorption thus become engineering requirements.

From the foregoing arrangements, it is apparent that the systems have been uniquely arranged to provide efficient carbon dioxide removal and yet require a minimum power consumption. Other advantages accomplished by these arrangements are: the minimization of heat loss and consequently power requirements by shuttling heat between two regenerators (as shown in FIG. 5); the minimization of power requirements for purging by using two separate adsorbent beds, one for water adsorption and the other for carbon dioxide adsorption; provision of a lightweight and low power consuming carbon dioxide removal system for long mission duration applications (this is accomplished as a result of the unique regeneration characteristics of the system); the elimination of problems resulting from the absence of motion and gravity forces, such as those that would be encountered in a liquid absorption system; the recovery of water adsorbed during the carbon dioxide removal process for use in the cabin; and the recouping of energy expended by virtue of extracting moisture utilizing the adsorbent effluent air for purging the silica gel beds.

It is to be understood that the invention is not limited to the specific embodiment herein illustrated and described, but may be used in other ways without departure from its spirit as defined by the following claims.

We claim:

1. In a carbon dioxide removal system in combination with a sealed compartment subjected to the exhalation of its occupants having a pair of moisture adsorbent beds and a pair of downstream carbon dioxide adsorbent beds, a blower located upstream of said pair of moisture adsorbent beds, connection means directing the blower discharge air to all of said adsorbers, means for regenerating both said pair of moisture adsorbent beds and said pair of carbon dioxide adsorbent beds, said regenerating means for said moisture adsorbent beds comprising conduit means connecting the outlet of each of said carbon dioxide adsorbent beds to the outlet of each of said moisture adsorbent beds, valve means in said conduit means for alternately connecting each of said carbon dioxide adsorbent beds with each of said moisture adsorbent beds, a heater in said conduit means spaced from said moisture adsorbent beds intermittently actuated solely when said moisture is being regenerated, said regenerative means for said carbon dioxide adsorbent beds comprising conduit means connecting the inlet of said carbon dioxide adsorbent beds with a source of pressure lower than adsorption pressure and means for alternately connecting said carbon dioxide adsorbent beds with said source of low pressure, conduit means connecting the inlet of said moisture adsorbent beds to the compartment, whereby the air discharging from the carbon dioxide adsorber is rehumidified just prior to being returned to said compartment.

2. In a carbon dioxide removal system in combination with a sealed compartment having a pair of moisture adsorbent beds and a pair of downstream carbon dioxide adsorbent beds, first, second, and third blowers, and a pair of heat exchangers, means defining a flow path for successively passing the air induced from the compartment through said first blower, one of said heat exchangers, one of said moisture adsorbent beds, one of said heaters, the other of said heat exchangers, one of said carbon dioxide adsorbent beds, the other of said heaters, then through the other of said moisture adsorbent beds and back to said compartment, means defining a second flow path for successively passing air from said compartment, through one of said heat exchangers, through said second blower and back to said compartment and means defining a third flow path for successively passing air from said compartment, through said other of heat exchangers, through said third blower and back to said compartment, and means for alternating and periodically actuating one of said pairs of heaters solely when the carbon dioxide adsorbent effluent air is directed to either of said moisture adsorbent beds.

3. In a system as defined in claim 2 including means for independently regenerating said pair of carbon dioxide adsorbent beds including means for alternately venting one of said pair of carbon dioxide adsorbent beds to a source of pressure lower than adsorption pressure solely when said last mentioned adsorbent bed is disconnected from either of said pair of moisture adsorbent beds.

4. The method of removing from a gaseous mixture contaminations resulting from the exhalation of human occupants of a closed compartment comprising the steps of inducing the flow of the gaseous mixture from the compartment and directing the flow of gaseous mixture in a given direction so that the residual gas is returned to the compartment, drying the gas mixture by passing the mixture alternately through a pair of absorbent beds formed from silica gel and controlling the alternating cycle at predetermined time intervals, removing the contaminant by passing the dry mixture alternately through a second pair of adsorbent beds formed from crystalline zeolite and controlling the alternating cycle at predetermined time intervals so that the cycles of alternating for the drying step are at a different time interval than the cycles of alternating for the contamination removal step regenerating the drying adsorbent beds with the discharging gases from the crystalline zeolite adsorbent beds just prior to returning the residual gas to the compartment so that the air will be rehumidified when injected into the compartment.

5. The method as defined in claim 4 including the steps of regenerating the drying adsorbent beds by pasing residual air discharging from the contaminant removal beds through the drying adsorbent beds, heating the air just prior to passing the same through the drying adsorbent, beds, and regenerating the contaminant removal adsorbent beds by subjecting said adsorbent beds to a receiver of low pressure.

6. A carbon dioxide removal system in combination with a sealed compartment subjected to the exhalation of its occupants comprising a pair of water adsorbent beds and a pair of carbon dioxide adsorbent beds, passage means for alternately interconnecting either of said pair of water adsorbent beds and said compartment and for alternately interconnecting either of said pair of water adsorbent beds and either of said pair of carbon dioxide adsorbent beds, means for alternately regenerating either of said pair of water adsorbent beds by alternately delivering through said passage means the air discharging from either of said pair of carbon dioxide adsorbent beds, means including a low pressure source for regenerating said pair of carbon dioxide adsorbent beds by interconnecting the one of said pair of carbon dioxide adsorbent beds and said source when the other of said pair of carbon dioxide adsorbent beds is regenerating either of said pair of water adsorbent beds, and means for interconnecting the compartment to whichever of said pair of water adsorbent beds is being regenerated for returning the water adsorbent bed discharge air back to said compartment.

7. A system for removing carbon dioxide from air subjected to the exhalation of occupants in a sealed cabin comprising, in combination, a cabin, a blower, first and second water adsorbent beds, a heater, and first and second carbon dioxide adsorbent beds, means for defining a flow path for successively passing the air from the cabin through the blower, through the first water adsorbent bed, to the first carbon dioxide adsorbent bed, to the second water adsorbent bed and back to the cabin, means for defining a supplementary flow path for successively passing the air from the cabin, through the blower, the first water adsorbent bed, the heater, the second water adsorbent bed, and bypassing the carbon dioxide adsorbent beds.

8. In a system for removing carbon dioxide from air contained in a cabin which is subjected to the exhalation of occupants, comprising, in combination, a cabin, a first, second and third blower, a first and second heater, a first and second water adsorbent bed, a first and second heat exchanger, and a first and second carbon dioxide adsorbent bed, means for defining a flow path for successively passing the air from said cabin to said blower, to said first heat exchanger, to said first water adsorbent bed, to said first heater, to said second heat exchanger, to said first carbon dioxide adsorbent bed, to said second heater, to said second water adsorbent bed, and back to said cabin, means defining a second flow path for successively passing the air from said cabin to said first heat exchanger to said second blower and back to said cabin, means for defining a third flow path for successively passing the air from said cabin to said second heat exchanger to said third blower and back to said cabin, a source of low pressure, means for interconnecting said source and said second carbon dioxide adsorbent bed.

9. A process for removing carbon dioxide from air contained in a sealed compartment and for returning the carbon dioxide free air back to the compartment comprising the steps of passing the carbon dioxide contaminated air over an active adsorbent formed from silica gel for removing the moisture content of the air, then passing the moisture free air over an active adsorbent formed from crystalline zeolite, regenerating the activated bed of silica gel by subjecting it to all of the carbon dioxide free air discharging from the activated adsorbent of crystalline zeolite, and returning the carbon dioxide free air back to the compartment with the moisture picked up during the regeneration of the adsorbent of silica gel and regenerating the adsorbent of crystalline zeolite by subjecting the activated zeolite adsorbent to a low pressure receiver whose pressure is substantially equal to zero pounds per square inch absolute.

10. Apparatus for removing carbon dioxide from air contained in a sealed compartment which compartment is subjected to the exhalation of its occupants comprising, in combination, a sealed compartment, a pair of moisture adsorbent beds and a pair of carbon dioxide adsorbent beds, a blower, a receiver forming a low pressure source, passage means defining a flow path for directing the air from said sealed compartment, to said blower alternately to one of said pair of moisture adsorbent beds or the other one of said pair of moisture adsorbent beds, alternately to one of said pair of carbon dioxide adsorbent beds or the other one of said pair of carbon dioxide adsorbent beds, alternately back to one of said pair of water adsorbent beds or the other one of said pair of water adsorbent beds and back to said sealed compartment and connecting means alternately interconnecting one of said pair of carbon dioxide adsorbent beds and said receiver and simultaneously interconnecting the other one of said pair of carbon dioxide adsorbent beds to said passage means.

11. Apparatus as claimed in claim 10 wherein said moisture adsorbent beds are formed from silica gel.

12. Apparatus as claimed in claim 10 wherein said carbon dioxide adsorbent beds are formed from crystalline zeolite.

13. Apparatus as claimed in claim 10 where the pressure in said receiver is substantially equal to zero pounds per square inch absolute.

14. Apparatus for removing carbon dioxide from air contained in a sealed compartment which compartment is subjected to the exhalation of its occupants comprising, in combination, a sealed compartment, a pair of moisture adsorbent beds and a pair of carbon dioxide adsorbent beds, a blower, a receiver forming a low pressure source, passage means defining a flow path for directing the air from said sealed compartment, to said blower alternately to one of said pair of moisture adsorbent beds or the other one of said pair of moisture adsorbent beds, alternately to one of said pair of carbon dioxide adsorbent beds or the other one of said pair of carbon dioxide adsorbent beds, alternately back to one of said pair of water adsorbent beds or the other one of said pair of water adsorbent beds and back to said sealed compartment, connecting means alternately interconnecting one of said pair of carbon dioxide adsorbent beds and said receiver and simultaneously interconnecting the other one of said pair of carbon dioxide adsorbent beds to said passage means, and means in said passage means for adding heat therein when said one of said pair of moisture adsorbent beds is communicating with the discharge end of one of said carbon dioxide adsorbent beds.

(References on following page)

References Cited by the Examiner

UNITED STATES PATENTS

| | | | |
|---|---|---|---|
| 1,948,779 | 2/1934 | Abbott et al. | 55—31 |
| 2,588,296 | 3/1953 | Russell | 55—33 X |
| 2,893,512 | 7/1959 | Armond | 55—58 |
| 2,899,474 | 8/1959 | Richards | 55—76 X |
| 2,992,703 | 7/1961 | Vasan et al. | 55—62 |
| 2,944,627 | 7/1960 | Skarstrom | 55—33 |
| 3,102,013 | 8/1963 | Skarstrom | 55—76 X |
| 3,150,942 | 9/1964 | Vasan | 55—71 |

REUBEN FRIEDMAN, *Primary Examiner.*

HERBERT L. MARTIN, *Examiner.*